United States Patent
Mahaffey (10) Patent No.: US 11,849,887 B2
(45) Date of Patent: Dec. 26, 2023

(54) DISPENSER

(71) Applicant: Kimberly-Clark Worldwide, Inc., Neenah, WI (US)

(72) Inventor: Cleary E. Mahaffey, Canton, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 252 days.

(21) Appl. No.: 17/044,229

(22) PCT Filed: Mar. 29, 2019

(86) PCT No.: PCT/US2019/024967
§ 371 (c)(1),
(2) Date: Sep. 30, 2020

(87) PCT Pub. No.: WO2019/191663
PCT Pub. Date: Oct. 3, 2019

(65) Prior Publication Data
US 2021/0015309 A1    Jan. 21, 2021

Related U.S. Application Data

(60) Provisional application No. 62/650,503, filed on Mar. 30, 2018.

(51) Int. Cl.
*A47K 10/36* (2006.01)
(52) U.S. Cl.
CPC ...... *A47K 10/3618* (2013.01); *A47K 10/3612* (2013.01); *A47K 10/3625* (2013.01)
(58) Field of Classification Search
CPC ............... A47K 10/3625; A47K 10/38; A47K 10/3618; A47K 10/3612; C03B 33/023

USPC ............................................................ 221/1
See application file for complete search history.

(56) References Cited

U.S. PATENT DOCUMENTS

| | | | | |
|---|---|---|---|---|
| 3,317,150 | A * | 5/1967 | Summersby | A47K 10/36 226/138 |
| 4,663,556 | A * | 5/1987 | Kumada | H02N 2/0045 310/333 |
| 5,312,021 | A * | 5/1994 | Nelson | A47K 10/32 239/289 |
| 11,179,010 | B2 * | 11/2021 | Sexton | A47K 10/3612 |
| 2002/0033405 | A1 * | 3/2002 | Gergek | A47K 10/3618 225/96 |
| 2003/0110911 | A1 * | 6/2003 | Kapiloff | A47K 10/36 83/649 |

(Continued)

FOREIGN PATENT DOCUMENTS

| | | | | |
|---|---|---|---|---|
| CN | 1481263 | A * | 3/2004 | A61M 15/0026 |
| JP | H01179056 | A * | 7/1989 | A61M 15/0026 |

(Continued)

*Primary Examiner* — Rakesh Kumar (57) ABSTRACT

A dispenser for dispensing consumable product having a consumable product holding area configured to store the consumable product within the dispenser; a dispensing mechanism having a spindle configured to hold and rotate the consumable product to facilitate a dispensing cycle to dispense a portion of the consumable product; and a motor having piezoelectric elements configured to (i) frictionally couple to the spindle to rotate the spindle in a first direction during a first motor state and (ii) uncouple from the spindle during a second motor state to allow the spindle to freely spin.

12 Claims, 5 Drawing Sheets

(56) References Cited

U.S. PATENT DOCUMENTS

| | | | |
|---|---|---|---|
| 2009/0212661 A1* | 8/2009 | Petrenko | H02N 2/002 |
| | | | 310/323.02 |
| 2010/0301157 A1 | 12/2010 | Keily et al. | |
| 2011/0132955 A1 | 6/2011 | Achton | |
| 2012/0255413 A1* | 10/2012 | Osborne, Jr. | A47K 10/3687 |
| | | | 83/436.5 |
| 2013/0248644 A1 | 9/2013 | Goeking et al. | |
| 2014/0158809 A1* | 6/2014 | Borke | A47K 10/36 |
| | | | 242/563 |
| 2014/0263811 A1* | 9/2014 | Goeking | A47K 10/3687 |
| | | | 242/563 |
| 2016/0114573 A1* | 4/2016 | Egan | B41F 35/06 |
| | | | 101/425 |
| 2016/0227970 A1* | 8/2016 | Diamond | B65H 43/00 |
| 2016/0325957 A1* | 11/2016 | Borke | A47K 10/36 |
| 2017/0296004 A1* | 10/2017 | Borke | A47K 10/3625 |
| 2018/0170703 A1* | 6/2018 | Osborne, Jr. | A47K 10/3625 |
| 2020/0163498 A1* | 5/2020 | Osborne, Jr. | A47K 10/3687 |
| 2021/0015309 A1* | 1/2021 | Mahaffey | A47K 10/3618 |
| 2021/0315426 A1* | 10/2021 | Goodrich | B31D 5/006 |
| 2022/0037976 A1* | 2/2022 | Magnusson | H02K 37/14 |

FOREIGN PATENT DOCUMENTS

| | | | | |
|---|---|---|---|---|
| JP | H10215590 A | * | 8/1998 | H02N 2/00 |
| JP | 2000184758 A | * | 6/2000 | H02N 2/00 |

* cited by examiner

DISPENSER

This application claims priority from U.S. provisional Patent Application Ser. No. 62/650,503 filed on 30 Mar. 2018, the entire contents of which are incorporated herein by reference.

TECHNICAL FIELD

This disclosure generally relates to dispensers for dispensing consumable products.

BACKGROUND OF THE DISCLOSURE

Systems dispensing consumable products are ubiquitous in many environments today. For example, paper hand towel dispensers are commonplace in many private, semi-private and public washrooms, work areas, food processing stations and kitchens. Many such dispensers are automated or motorized in that the dispenser feeds out a length of paper to the user without the user having to manually pull the paper from the dispenser. However, some users prefer to pull the paper from the dispenser and these motorized dispensers don't readily allow such a manual pull. It would be desirable to enable motorized dispensers to dispense both automatically and manually.

SUMMARY OF THE DISCLOSURE

In general, the subject matter of this specification relates to a dispenser, e.g., a paper product dispenser such as a paper towel dispenser or a bath tissue dispenser. One aspect of the subject matter described in this specification can be implemented in a dispenser for dispensing consumable product comprising: a consumable product holding area configured to store the consumable product within the dispenser; a dispensing mechanism having a spindle configured to hold and rotate the consumable product to facilitate a dispensing cycle to dispense a portion of the consumable product; and a motor having piezoelectric elements configured to (i) frictionally couple to the spindle to rotate the spindle in a first direction during a first motor state and (ii) uncouple from the spindle during a second motor state to allow the spindle to freely spin. Other embodiments of this aspect include corresponding methods, apparatus, and computer program products.

One aspect of the subject matter described in this specification can be implemented in a method that includes sensing a request to dispense the consumable product; in response to sensing the request, instructing a motor, having a piezoelectric element, to enter a first motor state to frictionally couple the piezoelectric element to a spindle in the dispenser to rotate the spindle in a first direction; determining an end to the first motor state; and in response to determining the end, instructing the motor to enter a third motor state to frictionally couple the piezoelectric element to the spindle to resist rotation of the spindle. Other embodiments of this aspect include corresponding systems, apparatus, and computer program products.

Particular embodiments of the subject matter described in this specification can be implemented so as to realize one or more of the following advantages. For example, traditional electronic (also referred to as motorized) dispensers don't readily allow a user to manually grab a tail of paper product exposed from the dispenser and pull out paper product as the motor is not energized and resists rotating thereby inhibiting the manual pull. The dispenser described herein uses a piezoelectric motor that can be configured to allow free-wheeling (e.g., low or no resistant rotating). This allows a user to manually pull out a length of towel, e.g., for example, when the dispenser is not powered, for example, when the dispenser's battery has been depleted or when a user simply desires a manual pull, while still allowing full motorized dispenses without reconfiguring the dispenser. Further, the piezoelectric motors are generally more power efficient than brushed DC motors used in traditional dispensers. Additionally, piezoelectric motors have a smaller form factor as compared to such DC motors, which provides flexibility in allowing dispenser designers flexibility in placing piezoelectric motors in dispensers and enables smaller overall dispensers.

The dispensers described herein can also enable a specified amount of rolled product to be dispensed (e.g., either through a motorized dispense cycle or through a manual user pull) and then the motor, through its piezoelectric elements, can prevent the rolled product from further unrolling by, for example, engaging and locking the spindle on which the rolled product is supported or rollers through which the product is routed, to cause the rolled product sheet to tear after the specified amount of product has been dispensed. This provides for portion control use of the rolled product by allowing only a certain amount of product to be dispensed during one cycle, as opposed to a user being able to wastefully dispense too much product and unnecessarily deplete the dispenser.

The details of one or more implementations of the subject matter described in this specification are set forth in the accompanying drawings and the description below. Other features, aspects, and advantages of the subject matter will become apparent from the description, the drawings, and the claims.

Repeat use of reference characters in the present specification and drawings is intended to represent the same or analogous features or elements of the disclosure.

DETAILED DESCRIPTION OF THE DISCLOSURE

The present disclosure relates to a dispenser utilizing a piezoelectric motor. For example, a rolled paper towel dispenser or bath tissue dispenser can have a piezoelectric motor that can be configured to operate in multiple states to allow custom dispensing operations not generally available on traditional dispensers. In some implementations, the motor can be configured to dispense a prescribed amount of rolled paper product and still allow the user to manually pull additional paper product from the roll, after the automatic dispense cycle, to obtain the amount of product desired by the user.

In other implementations, the motor can be configured to dispense a prescribed amount of rolled paper product and then lock the roll spindle, or otherwise inhibit rotation of the roll, such that after the prescribed amount of paper has been dispensed the user cannot manually pull additional product from the roll, e.g., until after a certain time period. In other implementations, the motor can be configured to freewheel to allow the user to manually pull product from the roll and then change states to prevent the roll from further spinning to limit the amount of product the user can dispense. In this later case, As the motor is not driving the roll to dispense product, this provides an efficient way to dispense product while still limiting excessive and wasteful product use.

Figure 1A:
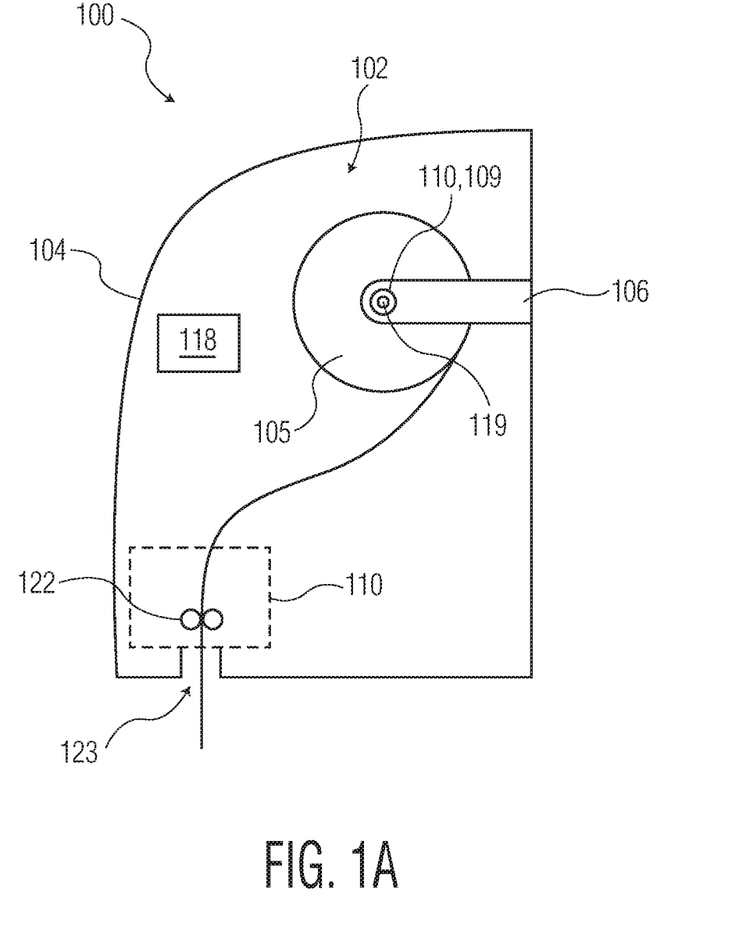
FIG. 1A is a right side cutaway representation of a first example product dispenser.
Figure 1B:
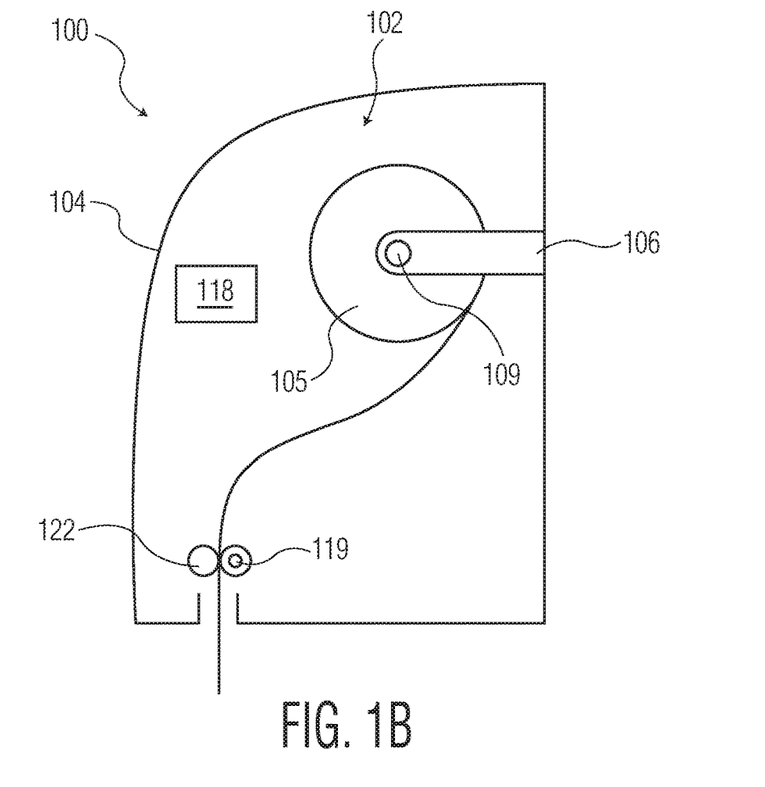
FIG. 1B is a right side cutaway representation of a second example product dispenser.

Dispensers with one or more of these functionalities are described in more detail below with referenced to FIG. 1, which is a right side cutaway representation of an example product dispenser 100, and FIG. 1B, which is a right side cutaway representation of a second example product dispenser.

The dispenser 100 can be, for example, a hand towel dispenser 100, bath tissue dispenser 100, or another rolled product dispenser such as a wiper dispenser. The dispenser 100, more generally, is a device that holds rolled consumable product and dispenses the consumable product (at least partly through a motorized process including inhibiting dispensing) in response to a stimulus, e.g., a user proximity stimulus or a user pull. The dispenser 100 includes a body 104 or outer cover or case 104, e.g., a composite, polymeric or metal housing. The outer cover 104 encloses, fully or partially, a product holding area 102 or interior 102 of the dispenser 100. The product holding area 102 holds, for example, the product-to-be-dispensed 105 (e.g., paper towels, bath tissue, wipes/wipers, etc.) by the dispenser 100 and one or more electrical or mechanical components used to enable the dispense process such as a motor, batteries, rollers, sensors to determine when a user requests a dispense, etc., as described in more detail below.

In some implementations, the dispenser 100 includes a processing device or apparatus 118. Alternatively if the processing device/apparatus 118 is remote to the dispenser 100, the dispenser can include a transceiver to wirelessly communicate with the processing device 118. The dispenser 100 can be located in, for example, a private, semi-private or public washroom, break room or kitchen, or clean room or other work station area.

The dispenser 100 also includes a dispensing mechanism 110. The dispensing mechanism 110 operates to facilitate dispensing a portion of the consumable product 105 from the holding area 102 (e.g., dispense a length of roll 105 for use to dry hands). In some implementations, for example, for rolled paper towels or wipers or bath tissue, the dispensing mechanism 110 is an electromechanical feed mechanism that includes or operates in conjunction with a motor 119 that, in response to a stimulus such as a user waving a hand proximate the dispenser 100, feeds a length of the roll 105 through an opening 123 in the body 104 to present to the user. For example, the dispensing mechanism 110 can include one or more rollers 122 through which a portion of the roll 105 is feed such that when the dispensing mechanism 110 actuates it pulls and unwinds the roll 105 (or causes the roll 105 to be pulled and unwound) to feed a portion of the roll 105 to the user. The rollers 122, for example, can include a knife or other cutting mechanism (e.g., a spring loaded mechanism) that cuts or perforates the sheet of paper 105 at the end of a dispenser 100 to enable the user to easily tear the cut sheet from the rest of the roll 105.

In some implementations, the motor 119, as shown in FIG. 1A, can be integral to or proximate the roll holder 106 and causes a spindle 109 (e.g., on which the rolled product 105 is mounted) to turn thereby causing the roll 105 to unwind and be dispensed. In other implementations, as shown in FIG. 1B, the motor 119 can be proximate or integral to the roller 122 and cause the roller 122 to turn thereby drawing product off the roll 105 and dispensing it through the opening 123. The motor 119 is described below in more detail with reference to FIGS. 1C and 2A-3C.

The motor 119 includes piezoelectric elements 125. A piezoelectric element 125 is a material that changes shape in response to the application of electric potential (e.g., voltage) across the material. For example, MICROMO Inc. of Clearwater, Florida, sells piezoelectric element-based motors including the Piezo LEGS motor.

Figure 1C:
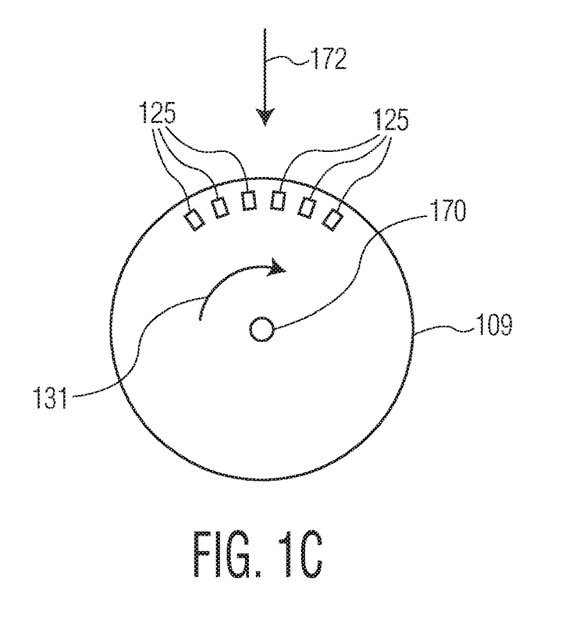
FIG. 1C is a detailed representation of example piezoelectric elements and a spindle.

In some implementations, the motor 119 can, through it elements 125, either directly engage the side or end portions of the spindle 109 (as shown in FIG. 1C) or rollers 122 or indirectly engage those devices 109, 122 through gears or other intermediary components to rotate the roll 105 to dispense product.

Figure 2A:
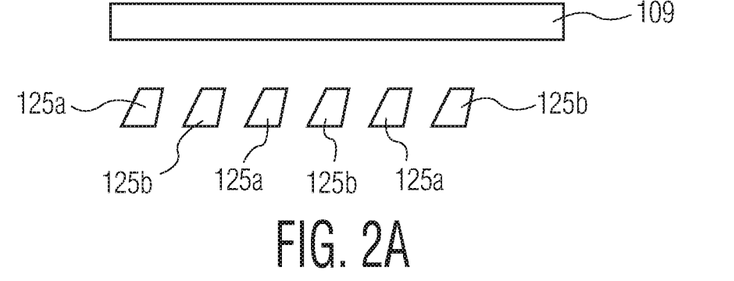
FIG. 2A is a first representation of a portion of a first example motor.

FIGS. 2A-2D are representations of portions of a first example motor 119 from the perspective 172 in FIG. 1C. In this implementation, FIG. 2A shows the motor 119 including two sets of piezoelectric elements 125a and 125b, and shows the spindle 109. Each set 125a, b can include one or more elements 125. The motor 119 can energize (e.g., apply voltage across) the two sets of elements 125 separately (or together) such that the motor 119 can energize only the elements 125a or only the elements 125b or can energize both sets of elements 125a, b simultaneously. FIG. 2A illustrates the piezoelectric elements 125 (and motor 119) in a second motor state where the elements 125 are uncoupled from or not engaging the spindle 109. In some implementations the motor 119 is in the second state when no power is applied to the motor 119. Further, in some implementations, the second motor state can include (i) no power applied to the motor 119 and (ii) some power applied to the motor 119 but not enough to cause the elements 125 to engage and rotate (or hold) the spindle 109. During the second motor state the spindle 109 (and thus the roll 105) can freely spin/freewheel, as would occur if a user manually pulls the tail of the roll 105 out through opening 123

Figure 2B:
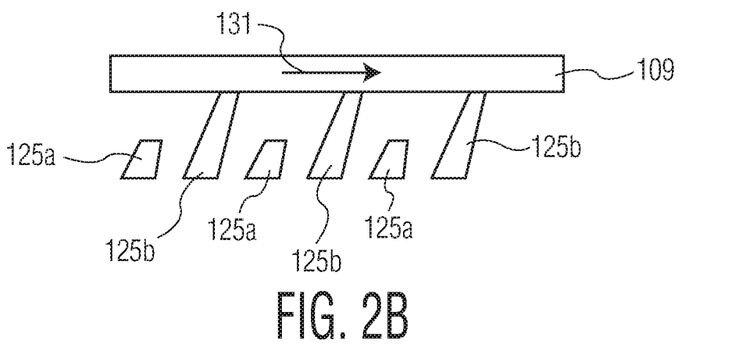
FIG. 2B is a second representation of a portion of the first example motor.

FIG. 2B shows the motor 119 energizing elements 125b, which causes the elements 125b to extend up and to the right, from their resting state in FIG. 2A, to engage and push/rotate the spindle 109 in the first (e.g., clockwise) direction 131 about the spindle's longitudinal axis 170. The motor 119 is not energizing the elements 125a in FIG. 2B.

Figure 2C:
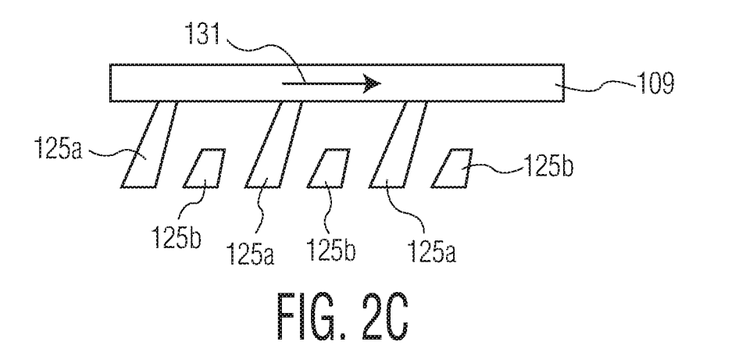
FIG. 2C is a third representation of a portion of the first example motor.

FIG. 2C shows the motor 119 energizing elements 125a, which causes the elements 125a to extend up and to the right, from their resting state in FIG. 2A, to engage and push/rotate the spindle 109 in the clockwise direction 131. The motor 119 is not energizing the elements 125b in FIG. 2C, which causes the elements 125b to contract to their resting state (e.g., shown in FIG. 2A) from their energized state in FIG. 2B. The motor 119 is in the first motor state when oscillating (alternating) between energizing elements 125a and 125b, which causes the spindle 109 to continuously rotate.

Figure 2D:
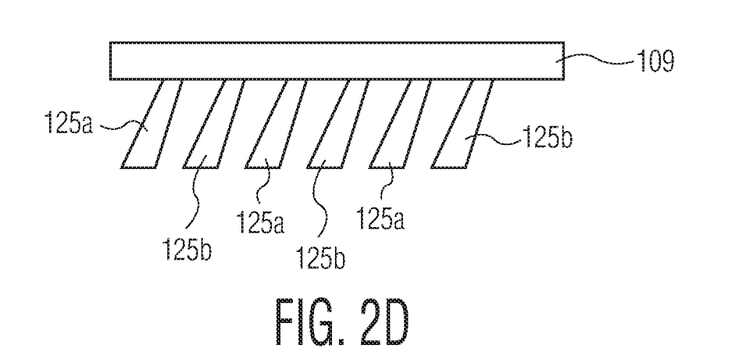
FIG. 2D is a fourth representation of a portion of the first example motor.

FIG. 2D shows the motor 119 in a third motor state having both elements 125a, b frictionally coupled to (e.g., engage) the spindle 109 to resist rotation of the spindle 109. To frictionally engage means that one or more elements 125 are in physical contact with the spindle 109 (or roller 122) and exert enough force against the spindle 109 (or roller 122) to use friction at the point(s) of contact to allow movement of the elements to correspondingly push (e.g., rotate) the spindle 109 (or roller 122) in the first motor state and resist rotation in the third motor state. In some implementations, such frictional engagement can include some (but not complete) slippage between the element(s) 125 and the spindle 109 (or roller 122) such that not all of the motive (or resisting) force of the elements 125 is transferred to the spindle 109 (or roller 122). In some implantations, the third motor state includes only one set of elements 125a orb being engaged to the spindle 109 to resist rotation.

In some implementations, the motor 109 is a normally free motor such that when it is not powered, the elements 125 are not energized and do not engage the spindle 109. In this case, the third motor state occurs with the elements 125a, b energized (e.g., in a constant, extended state).

Figure 3A:
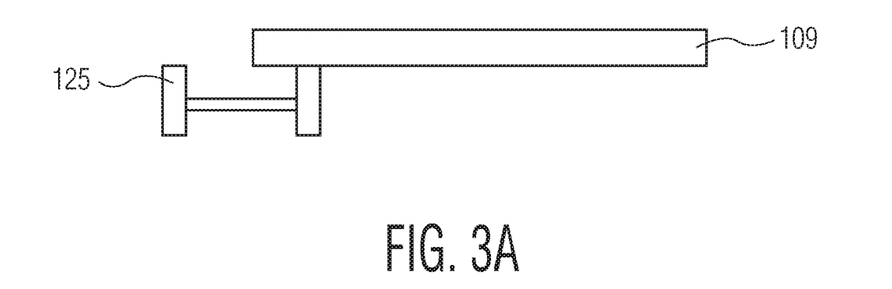
FIG. 3A is a first representation of a portion of a second example motor.
Figure 3B:
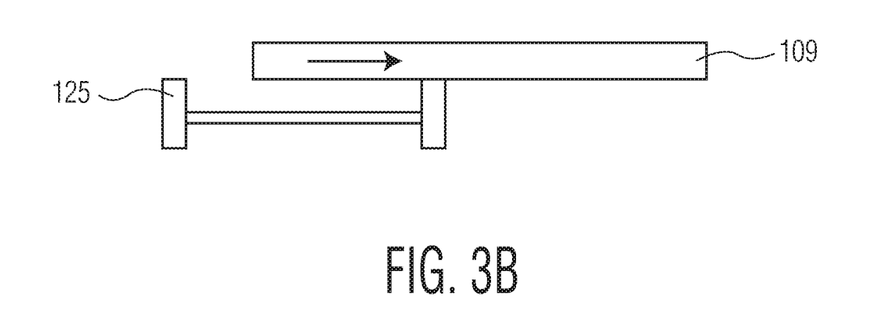
FIG. 3B is a second representation of a portion of the second example motor.
Figure 3C:
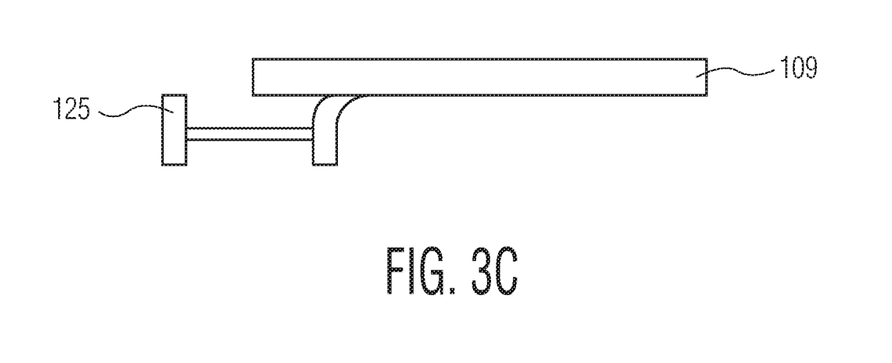
FIG. 3C is a third representation of a portion of the second example motor.

Although one type of element 125 was described with reference to FIG. 2, the motor 119 can be configured with other types of elements 125, for example, as described with reference to FIGS. 3A-3C. FIG. 3A is a first representation of a portion of a second example motor 119, FIG. 3B is a second representation of a portion of the second example motor 119, and FIG. 3C is a third representation of a portion of the second example motor 119. Similar to the elements 125 in FIG. 1C (and from the same perspective 172) the element 125 in FIG. 3 is positioned toward a periphery of the spindle 109 (or roller 122), e.g., offset from axis 170. In operation, the motor 119 energizes the element 125 to cause the element 125 to extend, as shown in FIG. 3B. This extension causes the element 125 to frictionally engage the spindle 109 to cause the spindle 109 to rotate about its axis 170 (and thus rotate the roll 105). Next the motor 119 de-energizes (e.g., removes or lessens the voltage across the element 125) the element 125 such that the element 125 contracts, as shown in FIG. 3C. During this contraction stage the distal end of the element 125, i.e., the end in contact with the spindle 109, deforms or is otherwise allowed to slide back without enough friction against the spindle 109 to cause rotation or only cause minimal rotation (e.g., less rotation then cause by the extension in FIG. 3B). In other words, during the contraction phase the element 125 is not frictionally engaged to the spindle 109. Repeating this extension and contraction process enables the roll 105 to be unwound.

As described above, the dispenser 100 can be a rolled paper towel dispenser 100. Some such dispensers include a dispensing sensor (not pictured) near the opening 123 or otherwise on the front cover of the dispenser 100. The sensor may be, for example, a heat sensor, motion sensor, proximity sensor (e.g., an infrared sensor) or the like to detect the presence of a user in relatively close proximity to the dispenser 100. In response to detecting a user (e.g., a user's hand(s) near the opening 123), the sensor generates a trigger signal that actuates the motor 119 to initiate a dispense to rotate the spindle 109 (or roller 122) to unroll a portion of the roll 105 and present a length of the paper through the opening 123 for the user to use.

In some implementations, the operating states of the motor 119, e.g., the first, second and third states, can be further described with reference to this example paper hand towel dispenser 100. For example, in response to the trigger signal from the sensor, the motor 119 enters the first motor state to rotate the spindle 109 by energizing the elements 125. The first motor state can last for a dispense cycle that is a predetermined time period (e.g., 2 seconds) or until a predetermined length of paper towels has been dispensed (e.g., 8 inches). The first motor state ends after the dispense cycle. The dispenser 100 can have consecutive first motor states, for example, as might occur if the user wanted more paper towels after the first dispense and triggered the sensor immediately after the previous dispense cycle.

Subsequent the first motor state, the motor 119 can enter the second motor state, which can be the default motor state of the dispenser 100 during periods when the motor 109 is not activated for a dispense cycle. For example, after a user initiates a dispense cycle and dries his/her hands, the motor 119 enters the second motor state during which the elements 125 are not engaged to the spindle 109, which allows the spindle 109 and roll 105 to spin freely. In addition to being the resting state of the motor 119, the second motor state also allows a user to manually pull an exposed tail of the roll 105 to unwind the roll 105 during a manual dispense, i.e., a dispense during which the motor 109 is not activated. For example, without triggering the sensor, if a user wants additional paper towels the user can unwind the roll 105 until the desired sheet length has been dispensed. Further, if the motor 119 is not receiving power, e.g., the motor's battery is dead, a user can still obtain paper towels from the dispenser 100, which a user could not readily do with conventional motorized dispensers.

Figure 4:
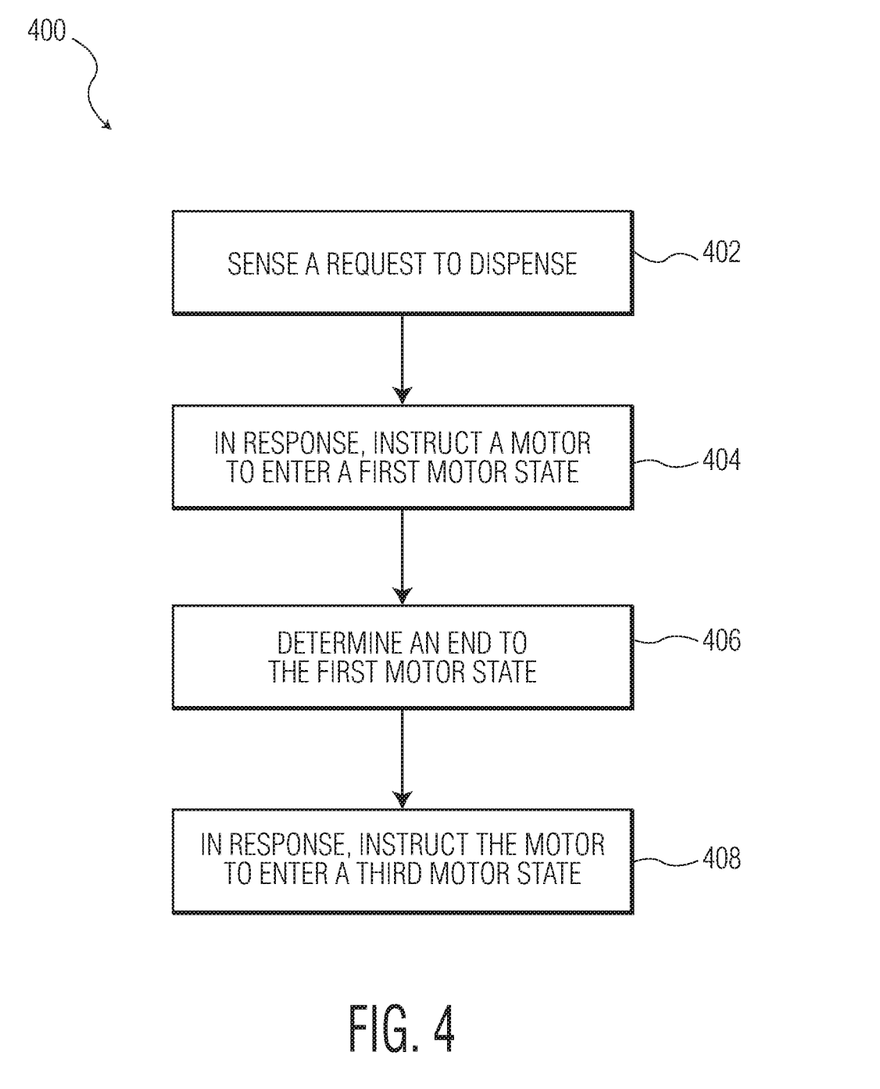
FIG. 4 is an example process for operating a dispenser.

The operation of the dispenser 100 can also be described with reference to a bath tissue dispenser 100 and FIG. 4, which is an example process 400 for operating a dispenser 100. For example, many conventional bath tissue dispensers are not motorized and do not provide a restriction on the amount of bath tissue a user can pull at once (as many users use excessive amounts of tissue which prematurely depletes the dispenser resulting in higher costs to the building owner in the form of additional bath tissue and more service calls to the washroom to refill the dispenser 100). As described below the dispenser 100 can address both of these deficiencies.

A request to dispense is sensed (402). For example, a proximity sensor of the dispenser 100 senses a user (e.g., a user's hand) in close proximity to the (opening 123) of the dispenser 100 indicating the user is requesting a dispense.

In response to the request, the motor is instructed to enter the first motor state (404). For example, the dispenser 100 causes the motor 119 to enter the first motor state to cause the spindle 109 to rotate to dispense bath tissue to the user. During the first motor state the motor 119 energizes the elements 125 to cause the spindle 109 to rotate.

An end to the first motor state is determined (406). For example, the dispenser 100 determines an end to the first motor state based on the expiration of an administrator-specified (i) time period from the time the motor 109 entered the first motor state, (ii) number of rotations of the roll 105 or (iii) length of sheet 105 dispensed ("Trigger Events"). These Trigger Events are directed to prevent the user from unwinding an unlimited amount of bath tissue, which prevents excessive and wasteful use of the product 105 and premature depletion of the dispenser 100.

In response to determining the end of the first motor state, the motor is instructed to enter the third motor state (408).

For example, in response to the dispenser 100 determining an end to the first motor state, the dispenser 100 instructs the motor 109 to enter the third motor state, which causes the elements 125 to prevent or discourage the spindle 109 from rotating and, thus, the roll 105 from further unwinding. This has the effect of, for example, limiting the amount of bath tissue the user can withdrawal from the dispenser 100—if the user keeps pulling but the motor 119 is preventing the roll 105 from unwinding then the sheet the user is holding will break/tear off from the remainder of the roll 105. This avoids excessive and wasteful use of the product 105.

In some implementations, after step 408 (e.g., 3 or 5 seconds after motor 119 enters the third motor state), the dispenser 100 can reset to step 402 to allow the user to obtain additional product 105, as needed. Because a user has to repeatedly go through cycles of withdrawing more product 105, instead of being able to unwind large portions of product at one time, as would be possible without process 400, the user's use of the product 105 is moderated. Although this process 400 has been described in the context of a bath tissue dispenser 100, it is also applicable to other types of rolled product dispensers 100.

In some implementations, the dispenser 100 does not enter the first motor state (step 402) but rather defaults to and is in the second motor state allowing the user to manually pull bath tissue from the dispenser 100. For example, if the dispenser 100 is configured not to automatically dispense product 105 and/or does not have a sensor to detect a user dispense request, the motor 119 can default to the second motor state. Thus after a user begins to pull product from the roll 105, which rotates the spindle 109, the dispenser 100 detects such rotation, e.g., through an optical or wheel type sensor, and after a designated Trigger Event instructs the motor 119 to enter the third motor state (e.g., step 408) to moderate product 105 usage.

EMBODIMENTS

Embodiment 1. A dispenser for dispensing consumable product having a consumable product holding area configured to store the consumable product within the dispenser; a dispensing mechanism having a spindle configured to hold and rotate the consumable product to facilitate a dispensing cycle to dispense a portion of the consumable product; and a motor having piezoelectric elements configured to (i) frictionally couple to the spindle to rotate the spindle in a first direction during a first motor state and (ii) uncouple from the spindle during a second motor state to allow the spindle to freely spin.

Embodiment 2. The dispenser of embodiment 1, wherein the first motor state occurs with power applied to the motor.

Embodiment 3. The dispenser of any preceding embodiment, wherein the second motor state occurs with no power applied to the motor.

Embodiment 4. The dispenser of any preceding embodiment, wherein the dispenser is a rolled hand towel dispenser.

Embodiment 5. The dispenser of any preceding embodiment, wherein the piezoelectric elements are configured to frictionally couple to the spindle to resist rotation of the spindle during a third motor state.

Embodiment 6. The dispenser of embodiment 5, wherein the third motor state occurs with power applied to the motor.

Embodiment 7. The dispenser of embodiment 6, wherein the dispenser is a bath tissue dispenser.

Embodiment 8. A dispenser for dispensing consumable product comprising a consumable product holding area configured to store the consumable product within the dispenser; a dispensing mechanism having a spindle configured to hold and rotate the consumable product to facilitate a dispensing cycle to dispense a portion of consumable product; and a motor having a piezoelectric element configured to (i) frictionally couple to the spindle to rotate the spindle in a first direction during a first motor state and (ii) frictionally couple to the spindle to resist rotation of the spindle during a fourth motor state.

Embodiment 9. The dispenser of embodiment 8, wherein the first motor state occurs with power applied to the motor.

Embodiment 10. The method of embodiment 8, wherein the fourth motor state occurs with no power applied to the motor.

Embodiment 11. A method for dispensing consumable product from a dispenser comprising: sensing a request to dispense the consumable product; in response to sensing the request, instructing a motor, having a piezoelectric element, to enter a first motor state to frictionally couple the piezoelectric element to a spindle in the dispenser to rotate the spindle in a first direction; determining an end to the first motor state; and in response to determining the end, instructing the motor to enter a third motor state to frictionally couple the piezoelectric element to the spindle to resist rotation of the spindle.

Embodiment 12. The method of embodiment 11, wherein determining the end to the first motor state comprises determining a number of revolutions of the spindle.

Embodiment 13. The method of embodiment 11, wherein determining the end to the first motor state comprises determining a lapse of a time period beginning with actuation of the motor proximate the instructing.

Embodiment 14. The method of any of embodiments 11-13, wherein the dispenser is a bath tissue dispenser.

Embodiment 15. The method of embodiment 11-14, wherein the third motor state occurs with power applied to the motor.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user computer (e.g., for purposes of displaying data to and receiving user input from a user interacting with the user computer). Data generated at the user computer (e.g., a result of the user interaction) can be received from the user computer at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description does not limit the invention to the precise terms set forth. Thus, while the invention has been described in detail with reference to the examples set forth above, those of ordinary skill in the art may affect alterations, modifications and variations to the examples without departing from the scope of the invention.

What is claimed is:

1. A dispenser for dispensing consumable product roll comprising:
 a consumable product holding area configured to store the consumable product roll within the dispenser;
 a dispensing mechanism having a spindle with an axis and configured to hold and rotate the consumable product roll around the axis to facilitate a dispensing cycle to dispense a portion of the consumable product roll; and
 a motor having piezoelectric elements located offset from the axis and configured to (i) frictionally couple to the spindle to rotate the spindle in a first direction during a first motor state and (ii) uncouple from the spindle during a second motor state to allow the spindle to freely spin.

2. The dispenser of claim 1, wherein the first motor state occurs with power applied to the motor.

3. The dispenser of claim 1, wherein the second motor state occurs with no power applied to the motor.

4. The dispenser of claim 1, wherein the dispenser is a rolled hand towel dispenser.

5. The dispenser of claim 1, wherein the piezoelectric elements are configured to frictionally couple to the spindle to resist rotation of the spindle during a third motor state.

6. The dispenser of claim 5, wherein the third motor state occurs with power applied to the motor.

7. The dispenser of claim 6, wherein the dispenser is a bath tissue dispenser.

8. A dispenser for dispensing consumable product comprising:
 a consumable product holding area configured to store the consumable product within the dispenser;
 a dispensing mechanism having a spindle with an axis and configured to hold and rotate the consumable product around the axis to facilitate a dispensing cycle to dispense a portion of consumable product; and
 a motor having a piezoelectric element located offset from the axis and configured to (i) frictionally couple to the spindle to rotate the spindle in a first direction during a first motor state and (ii) frictionally couple to the spindle to resist rotation of the spindle during a third motor state.

9. The dispenser of claim 8, wherein the first motor state occurs with power applied to the motor.

10. The dispenser of claim 9, wherein the third motor state occurs with power applied to the motor.

11. A method for dispensing consumable product roll from a dispenser comprising:
 sensing a request to dispense the consumable product roll;
 in response to sensing the request, instructing a motor, having a piezoelectric element, to enter a first motor state to frictionally couple the piezoelectric element to a spindle, holding the consumable product roll, in the dispenser to rotate the spindle in a first direction;
 determining an end to the first motor state; and
 in response to determining the end of the first motor state based on at least one of (i) an expiration of a specified time period from a time the motor entered the first motor state, (ii) a number of rotations of the consumable product roll or (iii) a length of sheet dispensed from the consumable product roll, instructing the motor to enter a third motor state by applying a voltage to the piezoelectric element to cause the the piezoelectric element to frictionally couple to the spindle thereby engaging the spindle to resist rotation of the spindle.

12. The method of claim 11, wherein the dispenser is a bath tissue dispenser.

* * * * *